Dec. 3, 1968    F. W. VAN ANTWERP ETAL    3,413,787
MECHANICAL FRUIT PICKER
Filed Aug. 25, 1966    3 Sheets-Sheet 1

INVENTORS
FREDERICK W. VAN ANTWERP &
ROBERT S. EDSALL
BY Mason, Fenwick & Lawrence
ATTORNEYS

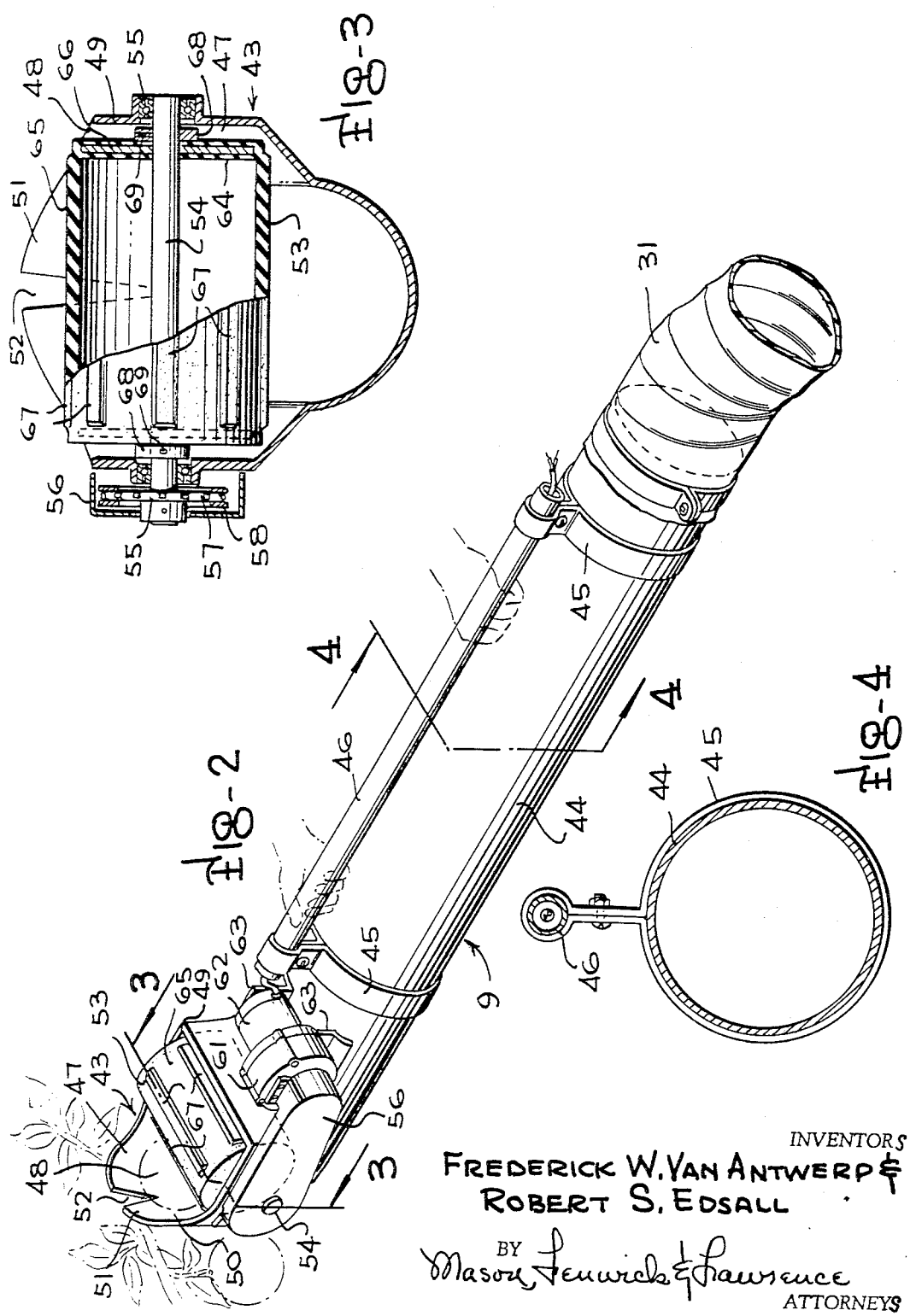

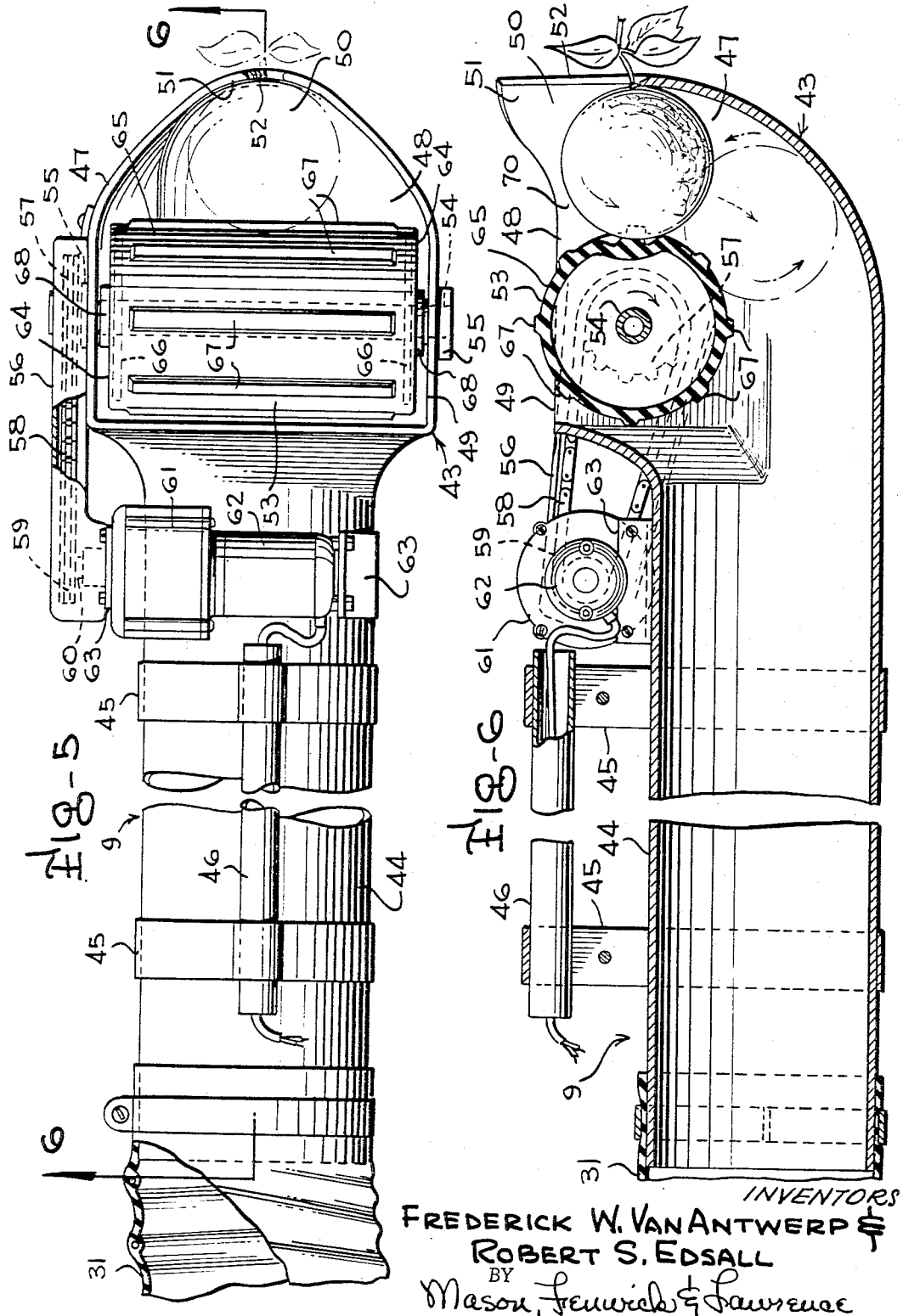

United States Patent Office 3,413,787
Patented Dec. 3, 1968

3,413,787
MECHANICAL FRUIT PICKER
Frederick W. Van Antwerp, 3508 Atlantic Blvd., and Robert S. Edsall, 1828 28th Ave., both of Vero Beach, Fla. 32960
Filed Aug. 25, 1966, Ser. No. 574,976
9 Claims. (Cl. 56—328)

This invention relates to mechanical devices for picking fruit, and more particularly to devices of this nature for snapping fruit from the stem which bears it and transporting the fruit to an accumulating receptacle.

While the present invention is adaptable to the picking of all fruit, it has particular advantages in the harvesting of citrus fruit. For many years all citrus fruit which was harvested for trade purposes was removed from the tree by cutting the stem with pruning clippers to preserve the natural seal of the peel, or external covering of the fruit, in the vicinity of the stem. If this natural seal is broken, the fruit deteriorates rapidly. It was later learned that the pruning clippers could be dispensed with, and the fruit removed from the tree by manually exerting a downward pressure on the fruit with a simultaneous longitudinal twisting action. In other words, by turning the base of the fruit upward in the direction of the stem, the stem would snap clean at its point of juncture with the fruit, leaving a completely sealed covering for the edible portion of the fruit.

The general object of the present invention is to provide a mechanical picker which will simultaneously exert downward pull and longitudinal twist to fruit to snap the stem cleanly and leave the outer covering unbroken.

A more specific object of the invention is to provide a picker having a head into which fruit can be drawn, with means in the head to cause the fruit to rotate about an axis at right angles to the stem to sever the fruit from the stem.

A further object of the invention is to provide a mechanical picker of this nature which will remove fruit from the tree with minimum bruising, or other damage to the fruit.

Another object is the provision of a mechanical picker which will include means to transport severed fruit to an accumulating area or receptacle.

A still further object of the invention is to provide a mechanical picker wherein the transporting means serves also to assist in drawing fruit in the head into engagement with the rotating means.

Yet a further object is the provision of such a picker adapted for mounting on a device which will mechanically lift and position an operator adjacent any selected area of a tree to be picked.

Other objects of the invention will become apparent from the following description of one practical embodiment thereof, when taken in conjunction with the drawings which accompany, and form part of, this specification.

In the drawings:

FIGURE 2 is an enlarged perspective view of the mechanical picker, apart from the carrying device;

FIGURE 3 is a vertical transverse section through the picker head, taken on the line 3—3 of FIGURE 2;

FIGURE 4 is a transverse vertical section through the transporting tube and handle portions of the picker, taken on the line 4—4 of FIGURE 2;

FIGURE 5 is a top plan view of the picker shown in FIGURE 2; and

FIGURE 6 is a longitudinal vertical section through the structure shown in FIGURE 5, taken on the line 6—6 of FIGURE 5.

Figure 1:
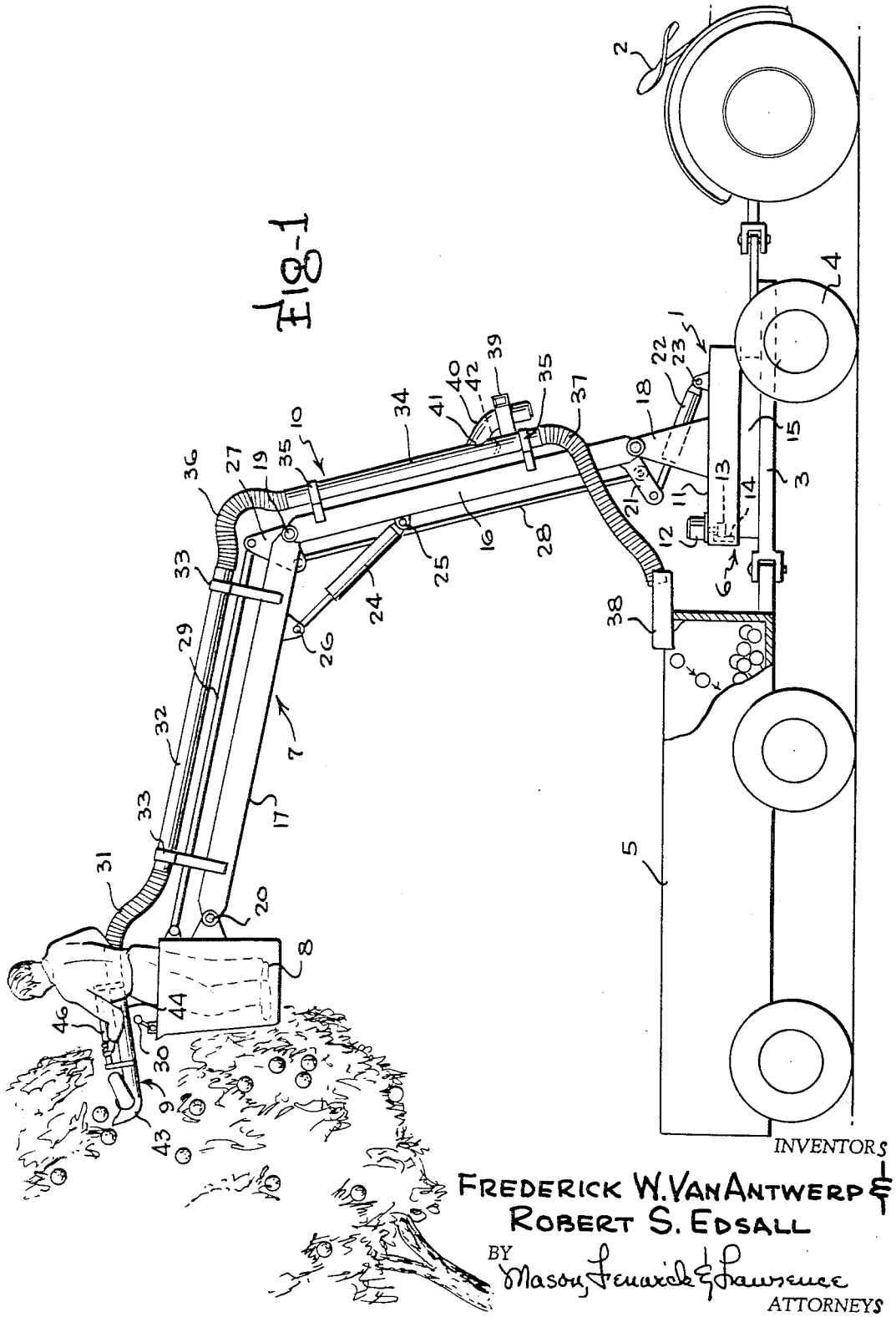
FIGURE 1 is a side elevation of a transporting vehicle having a boom carried operator's basket thereon, with a mechanical picker embodying the principles of the present invention mounted thereon for manipulation by an operator in the basket.

While it is possible to use the mechanical picker of the present invention while standing on the ground and moving about a tree, it is more convenient to have the picker mounted adjacent a platform, or basket, which is mounted on a boom for lifting the operator and the picker, and moving them to positions convenient to picking fruit at various locations on the tree. Therefore, the picker will be described in connection with such a mounting.

Referring to the drawings in detail, and first to FIGURE 1, there is shown a portable crane-like vehicle 1 drawn by a tractor 2. The vehicle has a frame 3, supported upon wheels 4, and has a coupling at its rear to which may be connected a box body type trailer 5 to receive picked fruit. The vehicle 1 supports a turntable 6, on which is mounted a boom structure 7 having a basket 8 at its free end in which an operator can stand. A mechanical picker 9 is mounted adjacent the basket at the end of a tubular conveyor 10 extending from the basket area to the trailer 5.

The turntable may be of any appropriate type, but is shown as including a rotary platform 11, on which is a motor 12 having a pinion 13 meshing with a ring gear 14 on a stationary mount 15. Operation of the motor will cause rotation of the platform 11 and consequently the boom structure and basket. It is contemplated that the platform will have almost full circle rotation for complete basket movement in azimuth, but will be prevented from rotating in a full circle to avoid winding the fruit conveyor about the boom structure.

The boom structure is composed of two boom members, a lower boom 16 and an upper boom 17. The lower boom has its bottom end pivotally mounted in pedestals 18 carried by the platform 11. The upper end of the lower boom member 16 and the lower end of the upper boom member 17 are pivotally interconnected at 19 to form an articulated boom structure. Basket 8 is pivotally attached at 20 to the free end of the upper boom member. At the bottom end of boom member 16, there is an actuating arm 21 which is connected to one end of a power cylinder assembly 22. The other end of the cylinder assembly is connected to the rotatable platform 11, as shown at 23. A second power cylinder assembly 24 bridges the pivotal connection between boom sections 16 and 17, and has its ends attached to the two boom sections as shown at 25 and 26. Selective operation of the power cylinders 22 and 24 will change the angles of the boom sections relative to the vehicle frame and to each other, to move the basket vertically and horizontally for selective positioning relative to a tree to be picked. In order to maintain the basket in level condition at all times, a lever 27 is pivotally attached to the pivot connection 19 between the two boom members, and it is connected by links 28 and 29 at its opposite ends to the arm 21 and the basket 8, respectively. Lever 27, boom section 16, the lower link and boom pivotal connections and link 28 form a parallelogram, while boom section 17, lever 27, link 29 and basket 8 form a second parallelogram. Thus, the basket is held in a vertical position at all times. It is contemplated that the movement of the booms, and consequently the basket position, will be controlled by the operator in the basket by means of a control lever 30 shown at the basket rim. The lines connecting lever 30 with power cylinders 22 and 24 and motor 12 have not been shown, but such remote control connections are well known in the art.

The picker 9 is shown as connected to one end of a length of flexible tubing 31 which, in turn, is connected to one end of a tube 32 mounted on boom section 17 by supports 33. A second tube 34 is fixed to the lower boom 16 by supports 35. A flexible length of tubing 36 connects the adjacent ends of tubes 32 and 34 across the pivotal connection between the two boom sections, and another length of flexible tubing 37 extends from the bottom end of tube 34 to a chute 38 at the forward top edge of the box body 5 of the trailer. This completes a tubing conveyor from the picker to the box body. The major portion of the conveyor system will be under suction, and for that purpose a fan 39 is mounted in a short length of tubing 40 which has one end connected to the tube 34. The wall of pipe 34 may be perforated at the juncture 41 with tube 40 so that air may flow into tube 40 yet fruit will be held in tube 34. A flap valve 42 can be located just below the juncture of tube 40 and biased to closed position, but openable upon contact by fruit passing along the conduit. This will serve to permit free flow of fruit while providing a seal for the upper part of the tube. Thus, fruit picked by the picker 9 will be drawn by suction through the conduit formed by the several tubes until it passes the flap valve 42, and then rolled by gravity through the remaining conduit to the chute 38 and trailer 5.

Referring now particularly to FIGURES 2 to 6, it will be seen that the picker 9 includes a head 43 at one end of a cylindrical body 44. The body carries a pair of longitudinally spaced straps 45 which support a handle 46 in parallel, spaced relation to the body. The handle is sufficiently long so that it may be grasped with both hands, with the hands spaced well apart so that the picker will be well balanced in use.

The head 43 of the picker is in the form of an upwardly opening hood 47, curving from the tubular body 44 to terminate in an open mouth 48, which for the most part is in a plane at right angles to the longitudinal axis of the picker body 44. The rearmost portion of the head is rectangular in cross-section, as shown at 49, while the forward section is centrally arched, as shown at 50. In the region of the arched section 50, the wall of the hood rises above the plane of the greater portion of the open mouth 48 to provide a fruit-engaging lip 51. The lip is centrally notched, as shown at 52, with the notch extending well below the plane of the open mouth. At least the head section of the picker will have some flexibility, and the notch 52 will give added flexibility to the head in the region of the fruit-engaging lip 51.

Spanning the rectangular section 49 of the head is a picking roller 53, mounted on a shaft 54, journaled in bearings 55 at the sides of the hood 47. One end of shaft 54 extends into a housing 56 at the side of the hood and carries a sprocket 57. Chain 58 is trained around the sprocket 57 and a sprocket 59 carried on shaft 60 which projects from a gear case 61. The gear case is attached to a motor 62, and the motor and gear case are supported on the picker body by means of brackets 63. It will be obvious that the picking roller 53 can be rotated by various means, and the motor and chain drive shown are simply illustrative.

The picking roller 53 is formed as a hollow cylinder having flat ends 64. It is contemplated that the cylindrical surface 65 will be flexible, and to that end the roller is made of a flexible material, such as rubber or a similar substance. To maintain the general cylindrical shape, the ends 64 have rigid plates 66 embedded in them. The outer surface of the roller has a plurality of longitudinally extending ribs 67 spaced about its periphery, which ribs may be integrally molded with the cylindrical roller. The cylinder has hubs 68 at its ends with set screws 69 to permit fixing the roller to the shaft 54 to rotate with it. The roller is positioned within the hood so that it extends slightly above the open mouth 48 and is spaced from the centrally arched fruit-engaging lip 51. The spacing of the roller from the lip is less than the diameter of the fruit to be picked, to obtain positive contact between the roller and the fruit as will be described.

The direction of rotation of roller 53 is such that the cylindrical surface adjacent the fruit-engaging lip 51 of the hood will be moving downwardly and rearwardly toward the tubular body member of the picker. This provides clockwise rotation for the roller when viewed as shown in FIGURE 6. It is to be noted that the arcuate surface of the roller and the inner surface of the fruit-engaging lip form a downwardly converging throat 70 into which fruit to be picked enters.

When the device is to be used, the vehicle 1 will be hitched to a tractor and a trailer will be coupled to the back of the vehicle. The apparatus can then be drawn into the grove where fruit is to be picked. An operator will enter the basket and, by manipulation of control lever 30, raise himself to the required height and position the basket adjacent the fruit area of a tree. The operator will grasp handle 46 of the picker with both hands and will then move the picker head towards the fruit, the open mouth 48 of the picker head being upward. As the fruit is approached, the operator will raise the picker head to bring the fruit into the converging throat 70 of the head and the attaching stem into the notch 52. Continued upward movement of the head will bring the fruit into contact with the cylindrical surface of the picking roller 53 and, as the fruit moves further into the throat, the roller will be depressed so that firm frictional contact will be obtained between the roller surface and the fruit. The stem end of the fruit will be against the inner wall of the arched section 50 of the head and the rotation of the roller will cause the fruit to rotate about an axis which is perpendicular to the stem of the fruit and substantially parallel to the shaft of the picking roller. This will impose a downward pulling force on the fruit and, at the same time, a twisting force, which will snap the stem clean at the juncture of the fruit, leaving the fruit unruptured. The fruit will continue its rolling motion down the concave face of the head into the tubular body 44 of the picker. At this time the suction in the transporting line will cause the fruit to move through the line to, and through, the valve 42, from which point it will roll by gravity onto the chute 38 and into the trailer box 5. The suction in the transporting line also serves to draw fruit into the open mouth of the picker head, and greatly facilitates the physical act of getting the fruit into the converging throat 70. It will be understood that the picking operation is a very rapid one, with the operator moving the picker head from fruit to fruit as rapidly as he can position it. The picked fruit will accumulate in trailer 5, and when the trailer is full it can be uncoupled from the vehicle 1 and an empty trailer attached in its place. As one area of the tree is picked, the operator can move himself quickly to another area and continue the picking operation. In some instances, the operator can pick several trees without moving the vehicle, as he can rotate and manipulate the boom structure to position himself at desired positions within quite a wide area.

It will be obvious that the same operation can be performed by using the picker while standing on the ground or on a ladder. The same picking mechanism can be used with various other types of lifting equipment.

While in the above one practical embodiment of the invention has been disclosed, it will be understood that the particular details of structure which have been shown and described are merely by way of illustration, and the invention can take other forms within the scope of the appended claims.

What is claimed is:

1. A mechanical fruit picker comprising, a hollow body and a head connected thereto, the head including an open-mounted hood communicating with the interior of the hollow body and having an end wall terminating at the open mouth, a picker member rotatably mounted in the hood adjacent the open mouth and having a substantially cylindrical fruit-engaging surface confronting and spaced from the end wall of the hood, and means to rotate the picker member, whereby fruit entering the open mouth of the hood will pass between the picker member and end wall and be caused to rotate upon the end wall through contact with the fruit-engaging surface of the picker member.

2. A mechanical fruit picker as claimed in claim 1 wherein, the end wall has a notch open to the wall edge at the open mouth and extending into the end wall at least to the area where fruit will be engaged between the end wall and picker member.

3. A mechanical fruit picker as claimed in claim 1 wherein, the fruit-engaging surface of the roller is deformable.

4. A mechanical fruit picker as claimed in claim 3 wherein, the cylindrical surface of the picking member has longitudinally extending ribs.

5. A mechanical fruit picker as claimed in claim 4 wherein, the end wall is arched in the plane of the open mouth of the hood.

6. A mechanical fruit picker as claimed in claim 5 wherein, there is a handle attached to and extending longitudinally of the body.

7. A mechanical fruit picker as claimed in claim 1 wherein, the fruit picker is mounted adjacent an operator's platform, the platform is attached to a rotatable articulated boom carried upon a mobile vehicle, and there is means at the operator's platform for controlling movement of the boom and platform.

8. A mechanical fruit picker as claimed in claim 7 wherein there is a fruit conduit attached to the hollow body, and means to cause picked fruit to move through the conduit.

9. A mechanical fruit picker as claimed in claim 8 wherein, there is a fruit-receiver releasably connected to the mobile vehicle.

References Cited

UNITED STATES PATENTS

| | | | |
|---|---|---|---|
| 787,314 | 4/1905 | Summerfield | 56—32 |
| 2,535,542 | 12/1950 | Lehman et al. | 56—328 |
| 2,616,768 | 11/1952 | Stemm | 56—328 X |
| 3,040,507 | 6/1962 | Lasswell | 56—328 |
| 3,138,912 | 6/1964 | May et al. | 56—328 |
| 3,143,844 | 8/1964 | Polk | 56—328 |

RUSSELL R. KINSEY, *Primary Examiner.*